United States Patent [19]
Rollins

[11] Patent Number: 5,144,286
[45] Date of Patent: Sep. 1, 1992

[54] PHOTOSENSITIVE SWITCH WITH CIRCUIT FOR INDICATING MALFUNCTION

[75] Inventor: George E. Rollins, Chelmsford, Mass.

[73] Assignee: Allen-Bradley Company, Inc., Milwaukee, Wis.

[21] Appl. No.: 563,175

[22] Filed: Aug. 6, 1990

[51] Int. Cl.$^5$ .............................................. G08B 21/00
[52] U.S. Cl. ................................... 340/635; 340/644; 250/571; 250/222.1
[58] Field of Search ............... 340/522, 523, 609, 619, 340/635, 641, 501, 555–557, 630, 644; 250/201.1, 526, 571, 221, 222.1, 223 R, 223 B, 224

[56] References Cited

U.S. PATENT DOCUMENTS

| | | | |
|---|---|---|---|
| 4,119,843 | 10/1978 | Hinds | 250/222.1 |
| 4,347,438 | 8/1982 | Spielman | 250/222.2 |
| 4,388,527 | 6/1983 | Fukuyama et al. | 250/214 R |
| 4,465,998 | 8/1984 | Durand | 340/557 |
| 4,559,453 | 12/1985 | Muggli et al. | 340/630 |
| 4,757,306 | 7/1988 | Kimura | 340/630 |
| 4,782,224 | 11/1988 | Haas et al. | 340/556 |
| 4,982,412 | 1/1991 | Gross | 250/222.1 |

Primary Examiner—Edward L. Coles, Sr.
Assistant Examiner—Jill Jackson
Attorney, Agent, or Firm—Quarles & Brady

[57] ABSTRACT

An alarm for a photosensitive detector used for detecting registration marks on a web or the like measures the voltage levels of an intensity signal derived from the registration marks and the background as it moves past the photosensitive switch. Pulses that are sufficient to operate the photosensitive switch but are below a level deemed to indicate reliable operation are counted and set an alarm if a predetermined number occur without an intervening pulse of a higher amount.

6 Claims, 2 Drawing Sheets

PHOTOSENSITIVE SWITCH WITH CIRCUIT FOR INDICATING MALFUNCTION

BACKGROUND OF THE INVENTION

1. Field of the Invention

The field of the invention is photosensitive switches and in particular photosensitive switches for reading registration marks and having an alarm output to indicate a loss of detection of those marks.

2. Background Art

Photosensitive switches are used in the processing of printed materials. Registration marks, typically on the border of a continuous web of printed paper, are detected by the photosensitive switch to produce a control signal. The control signal is used to activate and synchronize packaging machines that receive the web and then cut, seal, crimp, or fold the web material at the locations indicated by the registration marks.

Reliable detection of the registration marks requires that three conditions be met: the registration marks must have good contrast with respect the background web material, the web and registration marks must be accurately aligned with the photosensitive switch, and the optical path between the switch and the web must be clear of obstructions, in particular, the lens of the photosensitive switch must be clear of dust and the like. These conditions may change adversely during operation and therefore it is essential that the photosensitive switch provide a indication if the detection of the registration marks is lost so that appropriate corrections may be made.

One method of determining whether the detection signal has been lost is through the use of a "watch-dog" timer. A watchdog timer measures the time interval between the detection of each registration mark and produces an alarm signal if that interval exceeds a predetermined time limit.

One drawback to this use of a watch-dog timer is that the appropriate time limit depends on the web speed and on the spacing of the registration marks. The time limit must be changed if either the web speed or the mark spacing is changed. If several photosensitive switches are used on a single piece of equipment this adjustment of the time limit may be cumbersome. With any fixed time limit, the stopping of the equipment momentarily, or the operation of the equipment in step mode, will cause the alarms to be activated.

A second drawback to the use of a watchdog timer is that the optimum time limit may vary widely as a function of the product being produced. For this reason, these time limits may not be preset during manufacture of the photosensitive switch, but must be adjusted in the field. This requires the provision of readily accessible controls on each photosensitive switch for easily and accurately changing the predetermined time limit. Such controls increase the cost of the photosensitive switch.

A further drawback to an alarm using a watch dog timer is that it provides a signal only after the detection of registration marks is lost completely. Ideally, an alarm should indicate a problem condition prior to the complete loss of detection so that preventative measures can be taken.

SUMMARY OF THE INVENTION

The present invention provides an alarm system that is triggered not by a time limit, but by a predetermined number of marginal readings of registration marks. Specifically, the intensity signal produced by the passage of each registration mark past a photosensitive detector is analyzed by a first threshold detector which produces a count pulse when the intensity signal is above a first threshold, and by a second threshold detector which produces a range pulse when the intensity signal is above a second threshold greater than the first threshold. An alarm is produced in response to a predetermined number of the count pulses in the absence of associated range pulses.

It is thus one object of the invention to provide an alarm system for photosensitive detectors that may accommodate variable web speed and intermittent web motion. The count pulses serve in lieu of the time limit of the watchdog timer to establish an alarm threshold which determines when the alarm will be activated. A change in the speed of the movement of the registration marks past the photosensitive switch will correspondingly change the rate of the count pulses and thus automatically adjust the alarm threshold appropriately.

It is still another object of the invention to produce an alarm that may accommodate a wide variety of processes without readjustment. The use of the count pulses to establish the alarm threshold allows the alarm to be used with different patterns of registration marks without concern for their spacing or the web speed. The absence of a time limit for the alarm threshold permits the alarm threshold to be preset at the time of manufacture.

The photosensitive switch may have a control output responsive to the count pulses and not the range pulses.

It is yet another object of the invention, therefore, to produce an alarm indicating a potential loss of detection of the registration pulses before the control output is lost. The threshold for the count pulses is less than the threshold for the range pulses. The loss of the range pulses will activate the alarm when succeeded by a predetermined number of count pulses.

In one embodiment, the second threshold may be increased when the alarm output is present.

It is thus another object of the invention to produce an alarm that may be triggered but not reset by an intensity signal only a small amount above the second threshold as it exists before the alarm is activated.

Other objects and advantages besides those discussed above shall be apparent to those experienced in the art from the description of a preferred embodiment of the invention which follows. In the description, reference is made to the accompanying drawings, which form a part hereof, and which illustrate one example of the invention. Such example, however, is not exhaustive of the various alternative forms of the invention, and therefore reference is made to the claims which follow the description for determining the scope of the invention.

DETAILED DESCRIPTION OF THE PREFERRED EMBODIMENT

Figure 1:
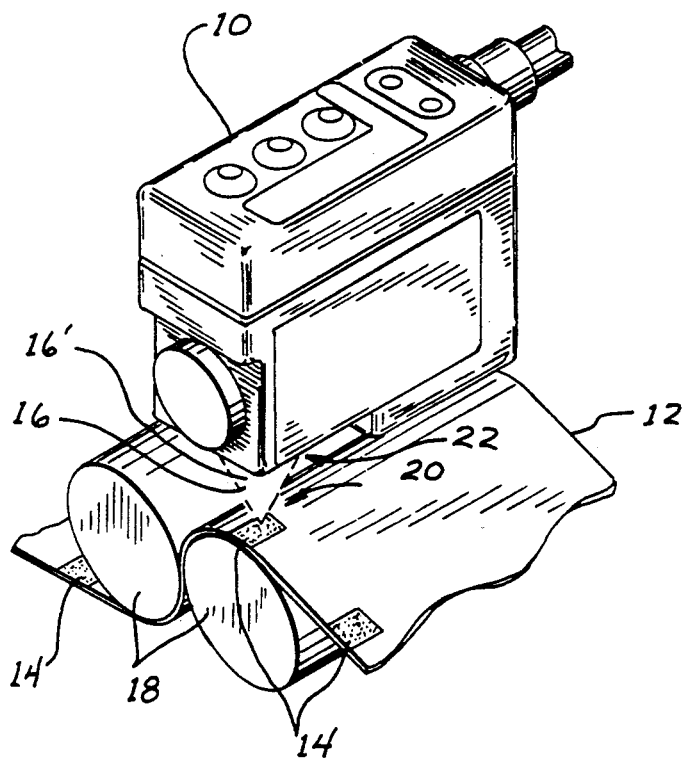
FIG. 1 is a perspective view of a photosensitive detector positioned above a moving web and showing the registration marks on that web.

Referring to FIG. 1, a photosensitive detector is positioned with respect to a moving web 12 so as to illuminate the web 12 and registration marks 14 contained on the web 12 and to receive reflected light 16 therefrom. The web 12 is transported past the photosensitive detector 10 by rolls 18 so as to maintain a constant distance from and alignment with the photosensitive detector. The illumination 6' from the photosensitive switch 10 is focused at a focal area 20 on the web 12 by a lens 22 (not visible in FIG. 1) and the same lens 22 receives the reflected light 16 from the focal area 20 on the web 12.

Figure 2:
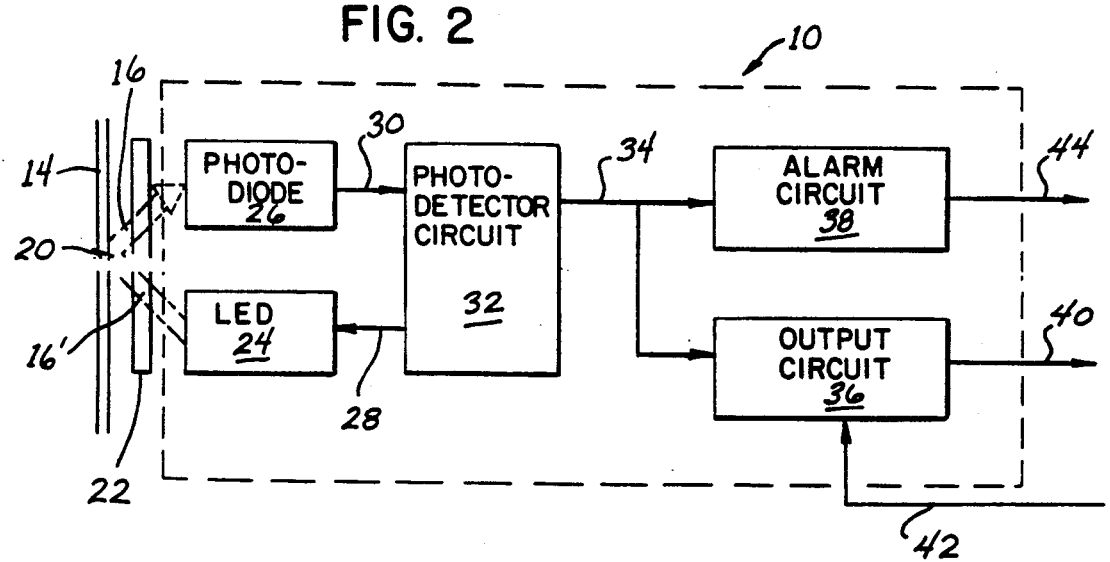
FIG. 2 is a block diagram showing the relationship between the principle functional blocks of the photosensitive detector of FIG. 1 and showing the alarm circuit.

Referring to FIG. 2, the photosensitive detector 10 employs a light emitting diode (LED) 24 to illuminate the web 12 and photodiode 26 to detect the reflected light 16 from the web 12. The signal 28 to the LED 24 is modulated by a photodetector circuit 32 to modulate the light 16' produced by the LED 24 and hence to modulate the light 16 reflected from the web 12. The signal 30 produced by the photodiode 26 receiving the reflected light 16, is synchronously demodulated by the photodetector circuit 32 to reduce interference from ambient light sources as is understood in the art. The demodulated signal is adjusted by automatic gain control incorporated in the photodetector circuit 32 to produce an intensity signal 34 varying between 0 and approximately 6 volts and proportional to the amount of light reflected from the focal area 20.

The intensity signal 34 is received both by an output circuit 36 and by the alarm circuit 38 of the present invention. The output circuit 36 detects the registration marks 14 by comparing the intensity signal 34 to a predetermined threshold value and biasing a output transistor (not shown) into conduction when that threshold is reached to produce an "open collector" control output 40. The control output 40 may be "latched" at the option of the user. In this case the control output 40 remains conducting until a positive voltage is applied to a reset line 42.

Figure 3:
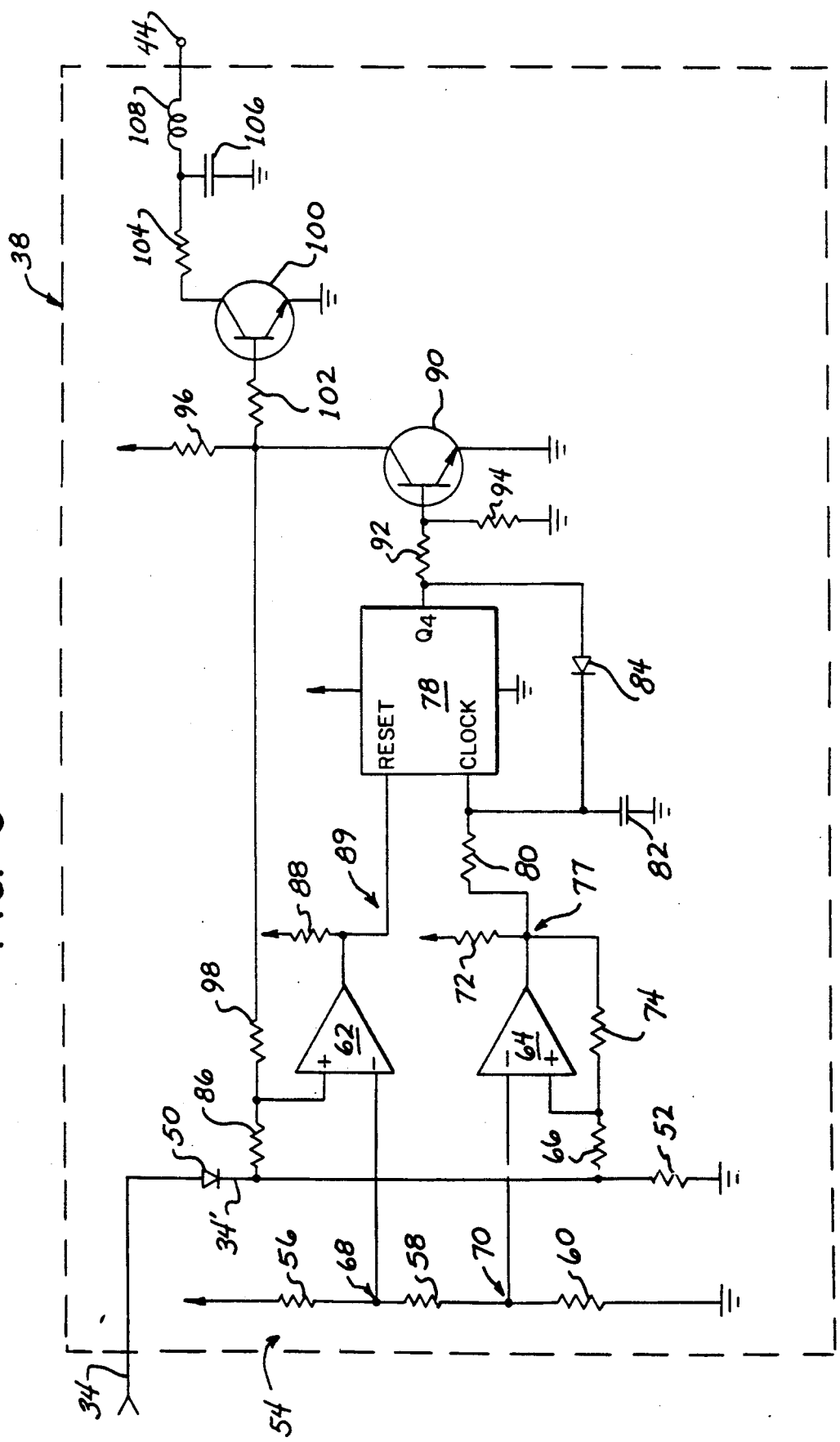
FIG. 3 is a schematic diagram of the alarm circuit of FIG. 2.

The alarm circuit 38 also receives the intensity signal 34 and produces an open collector alarm output 44 as will be described below. Referring to FIG. 3, the intensity signal 34 is input to the alarm circuit 38 via forward biased diode 50 followed by resistor 52 which provides a discharge path to ground. The voltage of the intensity signal 34' at the junction of the diode 50 and resistor 52 is essentially the same as the voltage of the intensity signal 34 produced by the photodetector circuit 32 of FIG. 2.

A resistor divider 54 is formed by series connected resistors 56, 58, and 60 connected between ground and a regulated 6.8 volt source. The resistor values of divider 54 are chosen so that a 1.5 volts reference voltage 68 is present at the junction of resistors 56 and 58 and a 1 volt reference voltage 70 is present at the junction of resistors 58 and 60.

The intensity signal 34' is connected to the non-inverting input of an open collector comparator 64 through resistor 66, and the inverting input of comparator 64 is connected to the 1 volt reference 70. The open collector output of the comparator 64 is tied to the regulated 6.8 volt source through pull up resistor 72 and also to the non-inverting input of the comparator 64 through resistor 74. Together, resistors 74 and 66 provide positive feedback to the comparator 64 creating a hysteresis in its switching action of about 100 millivolts.

The effect of this hysteresis is to delay the switching of the comparator 64 until its non-inverting input has dropped more that 100 millivolts below the 1 volt reference 70 if the output of comparator 64 is high, or until its non-inverting input has risen more than 100 millivolts above the 1 volt reference 70 if the output of the comparator 64 is low. This hysteresis reduces the possibility of multiple triggering of the comparator 64 if the intensity signal 34' incorporates some electrical noise.

The output of the comparator 64 will be termed the count signal 77 and is connected to the clock input of binary counter 78 through a low pass filter created by resistor 80 and capacitor 82. The purpose of this low pass filter is also to reduce the effects of electrical noise on intensity signal 34' on the triggering of the counter 78. The resistor 80 which connects directly between the output of comparator 64 and the clock input of the counter 78, also prevents the shorting to ground of the counter Q4 output by the output of comparator 64 through diode 84 as will be described below.

The comparator 64 thus produces a count pulse 77 which clocks the counter 78 at each transition of the intensity signal 34' from less than 1.1 volts to more than 1.1 volts.

The non-inverting input of comparator 62 is connected to the intensity signal 34' by means of resistor 86 and the inverting input of comparator is connected to the 1.5 volt reference 68. The open collector output of the comparator 62 is connected to the regulated 6.8 volt source by pull up resistor 88 and connected also to the reset input of the counter 78 so that when the output of the comparator 62 is high, the counter 78 is reset to zero. The output of the comparator 62 will be termed the range signal 89 and goes high when the intensity signal 34' rises above approximately 1.5 volts. The exact threshold of this comparator 62, however, may change as will be described.

Generally, then, the counter 78 will count every time a registration mark 14 causes the intensity signal 34' to rise above the 1 volt reference 70, and the counter 78 will be reset as the intensity signal 34' rises above the 1.5 volt reference 68. For normal operation of the photosensitive detector 10, the registration marks 14 will cause 2 volt or greater positive pulses in the intensity signal 34' and hence the count on the counter 78 will never exceed one.

As mentioned, misalignment of the web 12 or dirt on the lens 22 may decrease the detection ability of the photosensitive detector 10. This decreased detection ability is manifested in a decrease in the peak of the voltage pulses of the intensity signal 34'. When the maximum level of the voltage pulses of the intensity signal 34' drops below 1.5 volts but is at least 1 volt, the comparator 62 will not produce a range pulse 89 to reset counter 78 and hence the counter 78 will continue to count upward, clocked by the comparator 64. When seven sequential pulses having a peak greater than 1 volt but less than 1.5 volts have been counted, the Q4 output of the counter 78 goes high indicating a count of $2^4$ (i.e. $2^4-1$ defective pulses). This output Q4 is connected by diode 84 to the clock input of the counter 78 effectively latching the counter 78 at this count value.

The output Q4 of counter 78 is also connected to the base of a NPN transistor 90 via resistor 92 and biasing resistor 94 is connected from the base of transistor 90 to ground. The emitter of transistor 90 is also connected to ground to form a path from the collector of the transistor 90 to ground when the output Q4 of counter 78 is high.

The collector of transistor 90 is pulled up to the regulated 6.8 supply by resistor 96 and is connected via resistor 98 to the non-inverting input of comparator 62 serving with resistor 86 to increase the effective threshold voltage of the comparator 62 from 1.5 volts of the 1.5 volt reference 68 to 1.7 volts. Thus once seven defective pulses (i.e. with less than 1.5 volt peaks) have been detected in the intensity signal 34', a pulse of at least 1.7 volt pulse is required to reset the counter 78. This provides an additional margin against spurious resetting of the counter 78.

The collector of transistor 90 is also connected to the base of output transistor 100 through resistor 102. The emitter of transistor 100 is grounded and the collector is connected through resistor 104 to an electro-magnetic interference filter formed by capacitor 106 to ground and series common mode choke 108 which connects to the alarm output 44 of the photosensitive switch 10 as has been previously described.

In operation, the alarm output 44 is a closed circuit for so long as the intensity signal 34' consists of pulses of 1.5 volts or higher. Once seven pulses having a marginal voltage of less than 1.5 volts but greater than 1.1 volts are received, the alarm output 44 is opened from ground by transistor 100. Resetting of the alarm output 44 requires an intensity signal 34' pulse of at least 1.7 volts peak.

| | COMPONENT INDEX | |
|---|---|---|
| Ref. No. | Description | Manufacturer and Part No. |
| 62, 64 | Open collector comparator | National Semiconductor LM 2901 |
| 78 | Binary counter | National Semiconductor CD4024 |

The above description has been that of a preferred embodiment of the present invention. It will occur to those who practice the art that many modifications may be made without departing from the spirit and scope of the invention. For example, the number of pulses necessary to trigger the alarm condition may be changed from the seven described in the description of the preferred embodiment. Also, the reference voltages 68 and 70, used to distinguish normal intensity signal 34' from an intensity signal 34' indicative of imminent detection failure may be changed depending on specific photodetector circuitry 32 used. Similarly, it will be apparent to on of ordinary skill in the art that the amount of hysteresis of each comparator 62 and 64 may also be adjusted. In order to apprise the public of the various embodiments that may fall within the scope of the invention, the following claims are made.

I claim:

1. In a photosensitive detector for detecting light traveling along an optical path to be modulated by a plurality of moving objects and producing an intensity signal including a plurality of aperiodic pulses each pulse corresponding to the passage of one such object to indicate the instant of each passage and thus the number of such passages, the degree of modulation being adversely affected by the environment of the path, its alignment with respect to the objects and the optical characteristics of the objects, a diagnostic alarm comprising:
   a first threshold detector for producing a count pulse when the pulse of the intensity signal rises above a first threshold;
   a second threshold detector for producing a range pulse when the pulse of the intensity signal rises above a second threshold greater than the first threshold; and
   an alarm means for producing an alarm output in response to a predetermined number of the count pulses each associated with the passage of an object in the absence of associated range pulses and indicating the presence of adverse effects on the modulation.

2. The diagnostic alarm of claim 1 wherein the second threshold is increased when the alarm output is present.

3. The diagnostic alarm of claim 1 including an output means responsive to the count pulse for producing a control output signal.

4. In a photosensitive detector for detecting light traveling along an optical path to be modulated by a plurality of moving objects and producing an intensity signal including a plurality of aperiodic pulses each pulse corresponding to the passage of one such object to indicate the instant of each passage and thus the number of such passages, the degree of modulation being adversely affected by the environment of the path, its alignment with respect to the objects and the optical characteristics of the objects, a diagnostic alarm comprising:
   a first threshold detector for producing a count pulse when the pulse of the intensity signal rises above a first threshold;
   a second threshold detector for producing a reset pulse when the pulse of the intensity signal rises above a second threshold;
   a counter connected to the first and second threshold detectors for counting the count pulse from the first threshold detector to produce a count value indicating the passages of the objects and resetting the count value in response to the reset pulse from the second threshold detector; and
   an alarm means for producing an alarm signal in response to a predetermined count value at from the counter to indicate the presence of adverse effects on the modulation.

5. The diagnostic alarm of claim 4 wherein the second threshold is increased when the alarm signal is present.

6. The diagnostic alarm of claim 4 including an output means responsive to the count pulse for producing a control output signal.

* * * * *